US006758995B1

(12) United States Patent
Uchida et al.

(10) Patent No.: US 6,758,995 B1
(45) Date of Patent: Jul. 6, 2004

(54) PRODUCTION METHOD FOR PAPER FEED ROLLER

(75) Inventors: Kiyohiko Uchida, Chiba (JP); Hiroo Ushioda, Chiba (JP); Satoshi Ozawa, Chiba (JP); Yasuhiko Shimada, Chiba (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 356 days.

(21) Appl. No.: 09/807,813

(22) PCT Filed: Aug. 21, 2000

(86) PCT No.: PCT/JP00/05579

§ 371 (c)(1),
(2), (4) Date: Jun. 25, 2001

(87) PCT Pub. No.: WO01/14230

PCT Pub. Date: Mar. 1, 2001

(30) Foreign Application Priority Data

Aug. 20, 1999 (JP) .......................................... 11-233636

(51) Int. Cl.[7] ................................................ B29C 47/02

(52) U.S. Cl. .............................. 264/172.15; 264/171.1; 264/279; 492/20; 492/59

(58) Field of Search .............................. 264/149, 171.1, 264/172.15, 279; 492/20, 59

(56) References Cited

U.S. PATENT DOCUMENTS

| | | | | | |
|---|---|---|---|---|---|
| 3,880,664 | A | * | 4/1975 | Schulze | 588/254 |
| 3,929,957 | A | * | 12/1975 | Holden et al. | 264/150 |
| 3,971,115 | A | * | 7/1976 | Schneider et al. | 29/895.32 |
| 4,111,711 | A | * | 9/1978 | Kiehl et al. | 106/692 |
| 4,349,398 | A | * | 9/1982 | Kearns et al. | 156/71 |
| 4,398,960 | A | * | 8/1983 | Murray | 106/738 |
| 4,636,345 | A | * | 1/1987 | Jensen et al. | 264/122 |
| 4,863,541 | A | * | 9/1989 | Katz et al. | 156/158 |
| 5,026,451 | A | * | 6/1991 | Trzecieski et al. | 156/244.27 |
| 5,143,674 | A | * | 9/1992 | Busck | 264/145 |
| 5,151,147 | A | * | 9/1992 | Foster et al. | 156/244.12 |
| 5,545,297 | A | * | 8/1996 | Andersen et al. | 264/102 |
| 5,876,288 | A | * | 3/1999 | Jaskowiak | 464/181 |

FOREIGN PATENT DOCUMENTS

JP 10-52951 2/1998

OTHER PUBLICATIONS

Data sheet for Poly(vinyl alcohol), fibers.*

* cited by examiner

*Primary Examiner*—Michael Colaianni
*Assistant Examiner*—Monica A. Fontaine
(74) *Attorney, Agent, or Firm*—Young & Thompson

(57) ABSTRACT

A paper feed roller-producing method is to be provided, which enables more inexpensive mass produce of a high precision paper feed roller, with a high precision, having no connecting portion in a roller portion, by using a hydraulic composition.

The method for producing a paper feed roller includes a rotary shaft and a cylindrical roller portion integrated around an outer periphery of the rotary shaft, characterized in that the roller portion is formed by extruding a hydraulic composition and curing and hardening the extrudate.

11 Claims, 2 Drawing Sheets

1
2
3
4
R

R
R'
7

R
7

PRODUCTION METHOD FOR PAPER FEED ROLLER

TECHNICAL FIELD TO WHICH THE INVENTION BELONGS

The present invention relates to a method for producing paper feed rollers in which a hydraulic composition is used for roller portions and which are employed in apparatuses, such as printers, facsimile machines and copying machines, requiring papers to be accurately conveyed.

PRIOR ART

Formerly, metallic rollers, rubber rollers, etc. have been used as paper feed rollers. The metallic rollers have been each produced by attaching end plates with shaft portions to both end portions of a hollow metallic cylindrical body constituting a roller portion, respectively, by welding. In this case, although a rotary shaft of the metallic roller is formed by the shaft portions at the opposite ends, there is a very difficult problem in ensuring the concentricity between the metallic cylindrical body and the rotary shaft. Further, paper feed rollers in which a roller portion is constituted with hard rubber to reduce the weight have been used, but there is a problem in that errors are likely to occur in feeding papers owing to large heat expansion of the roller portion.

PROBLEMS TO BE SOLVED BY THE INVENTION

In order to solve the above-mentioned problems, Sumitomo Osaka Cement Co., Ltd. made an invention directed to a method for the production of an integrated paper feed roller by preparing a cylindrical molded body having a given length from a hydraulic composition according to a press molding method and fixing the molded body around the outer periphery of a rotary shaft, and Sumitomo Osaka Cement Co., Ltd. filed an application therefor under Japanese Patent Application No. 10-177,100. Further, Sumitomo Osaka Cement Co., Ltd. filed patent application under Japanese patent application No. 11-28,137, etc. directed to a method for the production of paper feed rollers in which roller portions are formed by connecting a plurality of cylindrical molded bodies.

According to this method, since the length of the cylindrical molded bodies themselves can be shortened as compared with that of a desired roller portion, non-uniform pressure applied during the press molding can be prevented, and a shaping mold can be made smaller. Further, if the length of a single cylindrical body is set based on the relationship between the size of papers and the number of such cylindrical molded bodies to be connected, and a plurality of the cylindrical molded bodies having a single shape are preliminarily prepared, plural kinds of paper feed rollers can be easily produced depending upon the sizes of papers by using given numbers of the cylindrical molded bodies having a single shape. This enables the inexpensive mass production of the paper feed rollers with a high precision.

However, since the roller portion is formed by connecting plural cylindrical molded bodies in the above method, there is a problem in that the hardness of the roller portion is low. Further, although the rigidity can be increased by appropriately selecting an adhesive used in the connecting portion, it leads to cost-up, and there is a limit for the increase in the rigidity.

PROBLEMS TO BE SOLVED

The present invention is aimed at solving the above problems, and providing a paper feed roller-producing method capable of mass-producing, with a higher precision at a more inexpensive cost, a high-precision paper feed roller having no connecting portion at a roller portion according to an extrusion molding with use of a hydraulic composition.

The paper feed roller-producing method according to the present invention is a method for producing a paper feed roller comprising a rotary shaft and a cylindrical roller portion integrated around the outer periphery of the rotary shaft, characterized in that the roller portion is formed by extruding a hydraulic composition and curing and hardening the extrudate product.

The following will be recited as preferred embodiments of the paper feed roller-producing method according to the present invention.

(1) A hollow cylindrical molded body is extruded from the hydraulic composition, the rotary shaft is inserted through a hole of the molded body, and the molded body is cured and hardened to integrate the rotary shaft and the roller portion.

(2) A hollow cylindrical molded body is extruded from the hydraulic composition, the molded body is cured and hardened, and the rotary shaft is inserted through a hole of the molded body to integrate the rotary shaft and the roller portion.

(3) A hydraulic composition is concentrically extruded around the rotary shaft, and cured and hardened to integrate the rotary shaft and the roller portion.

Among the above, the method (3) is most preferable.

The hydraulic composition preferably comprises 100 wt. parts of a mixed powder, 2 to 9 wt. parts of a workability improver, and 0.5 to 5 wt. parts of a thickening agent, said mixed powder comprising 40 to 80 wt % of a hydraulic powder, 10 to 50 wt % of a non-hydraulic powder having the average particle diameter smaller than that of the hydraulic powder by an order of one digit or more, and 10 to 30 wt % of an extrusion improver The extrusion improver is preferably an inorganic scaly material. As the inorganic scaly material, talc and mica may be recited.

The workability improver is preferably a powder or emulsion composed of at least one resin selected from a vinyl acetate resin or a copolymer resin with vinyl acetate, an acrylic resin or an acrylic copolymer resin, a styrene resin or a copolymer resin with styrene and an epoxy resin

Figures 1A, 1B, 1C:
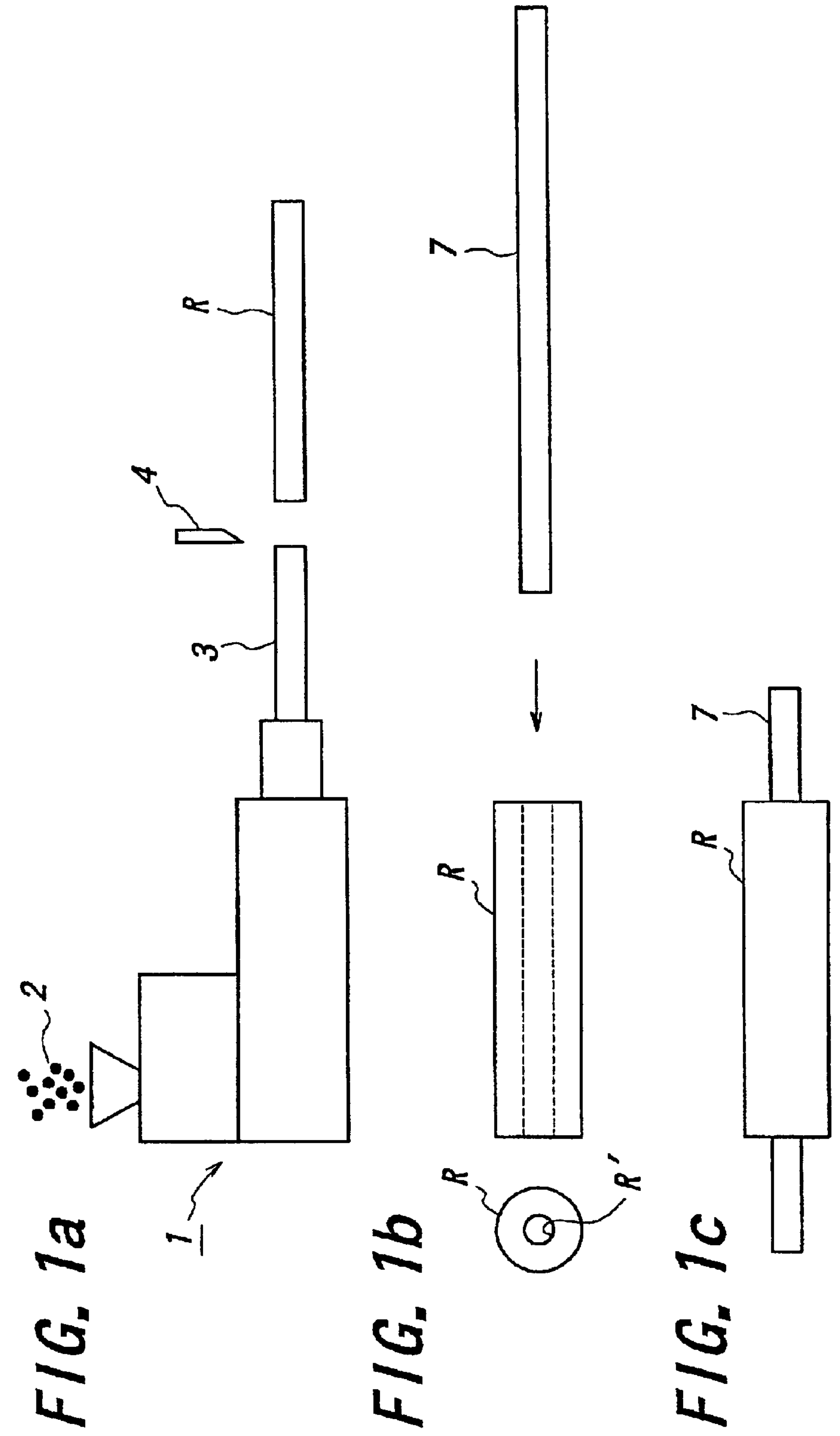
FIG. 1(*a*) is an illustrative view showing a step for extruding a cylindrical molded body according to one embodiment of the paper feed roller-producing method according to the present invention, FIG. 1(*b*) being an illustrative view showing a step for inserting a rotary shaft through the thus obtained cylindrical molded body before or after being cured and hardened, and FIG. 1(*c*) being a front view showing the thus obtained paper feed roller.

In the following, the present invention will be explained in more detail.

(1-1) Rotary Shaft

As the rotary shaft used in the present invention, those similar to the conventional rotary shafts in the paper feed rollers may be used. As to the shape of the shaft, a shaft for supporting the hollow cylindrical roller portion as a paper-feeding portion may be cut and finished to provide a bearing-fitting portion, a driving force transmission mechanism-fitting portion or the like. As a material of the rotary shaft, an ordinary material such as a SUS free cutting steel may be recited. The surface of the rotary shaft may be electrolessly plated with Ni—P.

(1-2) Hollow Cylindrical Roller Portion

The cylindrical roller portion in the present invention is produced by extruding a cylindrical molded body from a hydraulic composition, and curing and hardening the extrudate. The cylindrical roller portion and the rotary shaft may be integrated by any one of the above-mentioned methods (1) to (3).

In this case, the precision (a deviation precision) of the thus obtained cylindrical roller portion may be at a high level as it is. However, if the roller portion is subjected to centerless cutting or the like, the circularity of the cylindrical roller portion can be enhanced and the concentricity between the roller portion and the rotary shaft can be improved. The paper feed roller with a high precision can be obtained by enhancing the circularity and the concentricity.

The thickness of the cylindrical roller portion is determined by the outer diameter of the rotary shaft used and that of the paper feed roller. A tolerance of the diameter of the cylindrical roller portion is set at a given numeral value in design, which is ordinarily set at a working accuracy of a desired outer diameter of ±0.003 mm. The surface of the cylindrical roller portion itself may be finished coarsely by sand blasting or the like.

2. Hydraulic Composition

The hydraulic composition used in the present invention comprises a mixed powder of a hydraulic powder, a non-hydraulic powder and an extrusion improver, a workability improver and a thickening agent. The composition may include other additive if necessary, and further water contained upon necessity.

This will be detailed below.

(2-1) Hydraulic Powder

The hydraulic powder used in the present invention means a powder to be cured with water, for example, a calcium silicate compound powder, a calcium aluminate compound powder, a calcium fluoroaluminate compound powder, a calcium sulfaminate compound powder, a calcium alumino-ferrite compound powder, a calcium phosphate compound powder, a hemihydrate or anhydrous gypsum powder, a self-hardening lime powder and a mixed powder of any two or more kinds of these powders may be recited. As a typical example, powder such as Portland cement may be recited.

As to the grain distribution of the hydraulic powder, the Blaine's specific surface area is preferably not less than 2500 $cm^2/g$ from the standpoint of ensuring the hydraulic property regarding the strength of the molded body. The compounding amount of the hydraulic powder is 40 to 80 wt %, more preferably 45 to 55 wt %, of the mixed powder of the hydraulic powder, the non-hydraulic powder and the extrusion improver.

If the compounding amount is less than 40 wt %, the strength and the filling percentage decrease, whereas if it is more than 80 wt %, the filing percentage in obtaining the molded body decreases. Both cases are undesirable, because the molded body cannot withstand the working stress during mechanical working.

(2-2) Non-hydraulic Powder

The non-hydraulic powder means a powder which will not be cured even upon contact between water and it alone. The non-hydraulic powder includes powders which each form a reaction product between other dissolved ingredient through dissolution of that therefrom in an alkaline or acidic state or in a high pressure steam atmosphere. As typical examples of the non-hydraulic powder, mention may be made of calcium hydroxide powder, gypsum dihydrate powder, calcium carbonate powder, slag powder, fly ash powder, silica powder, clay powder and silica fumed powder, for example. The average particle diameter of the non-hydraulic powder is smaller than that of the hydraulic powder by an order of one or more digits, preferably two or more digits. The lower limit of the fineness of the non-hydraulic powder is not particularly set, so long as the effects of the present invention are not damaged.

The compounding amount of the non-hydraulic powder is set at preferably 10 to 50 wt %, more preferably 20 to 30 wt % of the mixed powder comprising the hydraulic powder, the non-hydraulic powder and the extrusion improver.

If the compounding amount is less than 10 wt %, the filling percentage decreases, whereas if it is more than 50 wt %, the strength and the filling percentage decrease. Both cases are undesirable, because they adversely affect various physical properties after molding and hardening, for example, chipping during mechanical working and dimensional stability. In considering the mechanical workability, etc., it is preferable to adjust the compounding amount of the non-hydraulic powder so that the filling percentage may not become too low. The addition of the non-hydraulic powder can increase the filling percentage of the molded body during molding and decrease the void percentage of the resulting molded body.

(2-3) Extrusion Improver

The extrusion improver used in the present invention is a material which improves slippage between a mold frame and the molded body during extrusion, reduces anisotropy in moldability and stabilizes the quality.

As the extrusion improver, use may be made of inorganic scaly materials such as talc (hydrous magnesium silicate) and mica, for example. Such inorganic scaly materials have excellent orientability and impart slipping property upon the surface of the molded body, so that the quality of the molded body is stabilized.

The compounding amount of the extrusion improver is preferably 10 to 30 wt %, more preferably 15 to 25 wt % of the mixed powder comprising the hydraulic powder, the non-hydraulic powder and the extrusion improver.

(2-4) Workability Improver

The workability improver means a material that improves moldability, mold-releasability, cutting/grinding workability and grinding accuracy of the molded body obtained from the hydraulic composition, particularly the material that contributes to improvement in cutting/grinding workability and grinding accuracy. That is, since the workability improver functions as a molding aid during the press molding, the hydraulic composition added with the workability improver improves the moldability. Further, the workability improver reduces brittleness of the cement-based hydraulic body, so that the molded body is released from the mold during the releasing step without being damaged at all, resulting in improvement in workability. In general, the molded body obtained from the hydraulic composition as a generally brittle material exhibits a cut state of a "crack-type mechanism" in cutting. In this case, problems occur that the material is broken or chipped (including microscopical phenomena).

Since the hydraulic composition in the present invention contains the workability improper, it is possible to prevent cracking and chipping of the above material to which toughness is imparted to exhibit the mechanical workability in the molded body as a solid material. That is, the workability of the molded body obtained from the hydraulic composition which has been difficult to effect mechanical workings such as cutting, grinding, etc. can be improved to the same level as that of the metallic materials with the workability improver. The molded body can be cut with the lather or the like and ground with a cylindrical grinder or the like as in the same manner as in the metallic materials. The molded body can be finely worked within an order of $\mu$m relative to a desired dimension.

The compounding amount of the workability improver is set at 2 to 9 parts by weight, preferably 3 to 4 parts by weight, relative to 100 parts by weight of the mixed powder of the hydraulic powder, the non-hydraulic powder and the extrusion improver. The compounding amount of less than 2 parts by weight is not preferable, because cuttability degrades. If it is more than 9 parts by weight, both the grinding accuracy and the dimensional stability after the grinding degrade, although excellent moldability is obtained. The grain size is generally that discrete grains are in a diameter range of not more than 1 $\mu$m.

As the workability improver, use may be made of a powder or an emulsion of at least one kind of resins selected from a vinyl acetate resin, a copolymer resin with vinyl acetate, acrylic resin or a copolymer with acryl, a styrene resin or a copolymer with styrene, and an epoxy resin. As the above vinyl acetate copolymer resin, a vinyl acetate-acryl copolymer resin, a vinyl acetate-beova copolymer resin, a vinyl acetate-beova terpolymer resin, a vinyl acetate-maleate copolymer resin, a vinyl acetate-ethylene copolymer resin, a vinyl acetate-ethylene-vinyl chloride copolymer resin, etc. may be recited. As the acrylic copolymer resin, an acryl-stryrene copolymer resin, an acryl-silicone copolymer resin, etc. may be recited. As the styrene copolymer resin, a styrene-butadiene copolymer resin may be recited.

(2-5) Thickening Agent

The thickening agent is a material that exhibits adhesion when dissolved in water. This agent is an ingredient effective for enhancing the bonding forces among the particles of the hydraulic powder and the non-hydraulic powder, maintain the shape of the molded body after molding, ensuring the water holding ability and forming a compact hardened body.

As the thickening agent used in the present invention, mention may be made of methyl cellulose, hydroxyethyl cellulose, carboxymethyl cellulose, etc.

The compound amount of the thickening agent is preferably 0.5 to 5 parts by weight, preferably 3 to 4 wt. parts relative to 100 parts by weight of the mixed powder of the hydraulic powder, the non-hydraulic powder and the extrusion improver.

(2-6) Other Additives

In addition to the above indispensable ingredients (2-1) to (2-3), the mixture comprising the hydraulic composition in the present invention may contain an aggregate, such as silica sand, as a bulk filler, at such a rate that the aggregate is 10 to 50 parts by weight, preferably 20 to 30 parts by weight relative to 100 parts by weight of the mixed powder of the hydraulic powder, the non-hydraulic powder and the extrusion improver. In order to further improve the moldability, a known ceramic molding aid may be added at a rate of 1 to 10 parts by weight, preferably 3 to 6 parts by weight relative to 100 parts by weight of the mixed powder. Further, in order to suppress the dimensional change due to the shrinkage of the material during hardening, a water repellant to decrease absorption of water, such as silicone oil, may be added at a rate of 0.5 to 5 parts by weight, preferably 1 to 2 parts by weight relative to 100 parts by weight of the mixed powder.

In order to formulate a molding mixture by using the hydraulic composition, the molding mixture is obtained by mixing the hydraulic composition, other additive to be added if necessary, and water in an amount of not more than 30 parts by weight and preferably not more than 25 parts by weight relative to 100 parts by weight of the mixture of the hydraulic powder, the non-hydraulic powder and the extrusion improver. Water is preferably as few as possible from the standpoint of suppressing shrinkage on drying.

The mixing method is not particularly limited. Preferably, a mixing method or a mixer is preferred, which can afford powerful shearing stress upon the mixture. Since the average particle diameter of the non-hydraulic powder is smaller than that of the hydraulic powder by an order of not less than one digit, a time required for mixing will be very longer to obtain a uniform mixture unless the shearing mixer is used.

Further, in order to make the handling of the mixture better in molding, the mixture may be granulated to a size suitable for a shape to be molded, following the mixing. The granulation may be effected by using a known method such as rolling granulation, compression granulation, stirring granulation or the like.

3. Method for Producing the Paper Feed Rollers (3-1) Formation of Cylindrical Molded Bodies A cylindrical molded body having a given length and a given outer diameter is molded from a given hydraulic composition.

A. A hollow cylindrical roller molded body having a hole in a central portion through which a rotary shaft is to be passed is extruded from a hydraulic composition in (1) a case where the hollow cylindrical roller molded body is extruded, the rotary shaft is inserted through the hole of the molded body thus obtained, and the molded body is cured and hardened to integrate the rotary shaft and the roller portion and (2) a case where the hydraulic composition is molded in a hollow cylindrical form, the molded body is cured and hardened, and the rotary shaft is then inserted through the hole of the hardened body. For example, extrusion molding is effected by using an ordinary extruding machine shown in FIG. 1(*a*), for example, and a hollow cylindrical roller molded body is obtained by cutting the extruded body in a given length. In FIG. 1(*a*), 1 denotes the extruding machine, 2 a molding material, 3 a hollow cylindrical extruded body, 4 a cutter for cutting the extruded body, and R a hollow cylindrical roller molded body.

Figure 2B:
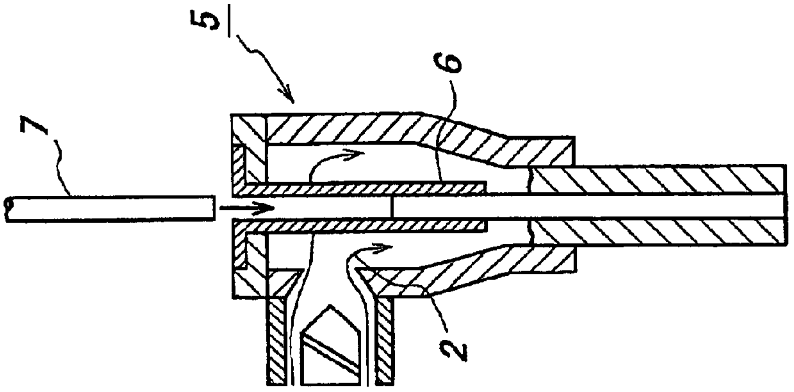
FIGS. 2(*a*) and 2(*b*) show an extruding apparatus directed to another embodiment of the paper feed roller-producing method according to the present invention.
Figure 2A:
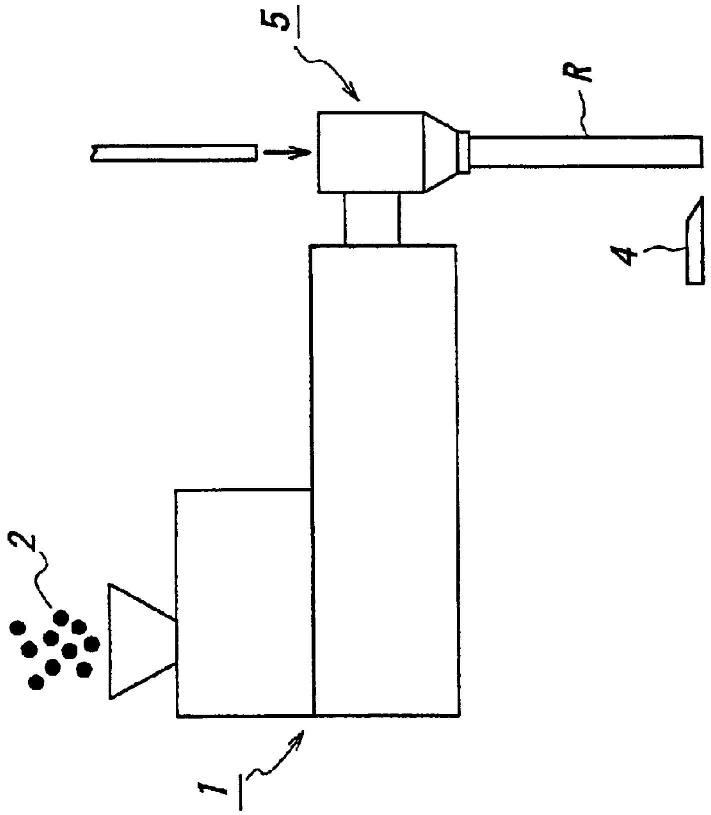

In a case (3) where a hollow cylindrical roller molded body is concentrically extruded around a rotary shaft from a hydraulic composition, and the molded body is cured and hardened to integrate a rotary shaft and the roller portion, the hydraulic composition is extruded into the roller molded body concentrically around the rotary shaft by using an extruding machine shown in FIGS. 2(*a*) and 2(*b*). In FIGS. 2(*a*) and 2(*b*), 1 denotes an extruding machine having a cross head 5 fitted to a tip portion of an extruding outlet of the extruding machine. While the rotary shaft 7 is downwardly fed inside a cylindrical guide 6 for the rotary shaft extended vertically within the cross head, the extruding material is extruded integrally around the rotary shaft when the material comes out through a tip end of the cross head. Then, rotary shaft portions are exposed by cutting off the hydraulic composition at opposite end portions of the rotary shaft.

(3-2) Rotary Shaft

The rotary shaft of the paper feed roller in the present invention is inserted through and fixed in the hole, while aligned, which is formed in a central portion of the cylindrical roller portion such that the hole may be concentrically with the outer peripheral face of the cylindrical roller portion. The entire length of the rotary shaft, the length of the inserted portion and that of outwardly exposed portions of the rotary shaft are appropriately determined. If the rotary shaft is attached to the hole of the cylindrical roller portion with an adhesive or the like, the outer diameter of the rotary shaft is smaller than that of the inner diameter of the hole of the cylindrical molded body by around 10 to 50 μm, preferably 10 to 30 μm. If it is less than 10 μm, it is difficult to assemble the cylindrical molded body around the rotary shaft, whereas if it is more than 50 μm, the concentricity (deviation from the concentricity) between the rotary shaft and the cylindrical molded body becomes larger, resulting in poor precision of the roller. If it is less than 30 μm, the cylindrical molded body can be attached to the rotary shaft due to shrinkage following the hardening of the cylindrical molded body without using adhesive in combination.

(4) Assembling the Cylindrical Molded Body Around the Rotary Shaft (4-1) First Method A method for producing the paper feed roller according to the present invention comprises extruding a cylindrical molded body from a hydraulic composition, and thus obtaining the cylindrical molded body. A rotary shaft 7 is inserted through a hole R' in the center of the cylindrical molded body R. In this case, the cylindrical molded body is formed such that it has strength high enough to be not broken during the insertion of the rotary shaft into the central portion of the cylindrical molded body. Thereafter, the cylindrical molded body is formed by curing and hardening, and the cylindrical roller portion is integrally formed around the outer periphery of the rotary shaft.

(4-2) Second Method

A cylindrical molded body is extruded from the hydraulic composition, a hollow cylindrical roller portion is formed by curing and hardening, and then a rotary shaft is inserted through and integrally fixed with a hole of the cylindrical roller portion.

(4-3) Third Method

A hollow cylindrical roller molded body is extruded concentrically around a rotary shaft from the hydraulic composition, and cured and hardened to integrate the rotary shaft and the roller portion.

The cylindrical molded body extruded may be cured and hardened by one or any combination of ordinary temperature curing, steam curing, autoclave curing, etc. Considering the mass production, chemical stability of the products, dimensional stability, etc., autoclave curing is preferred. The hardening reaction of the cylindrical molded body can be completely terminated by the autoclave curing for around 5 to 10 hours, so that a dimensional change thereafter is extremely small.

In the above method, at least 10 μm clearance is necessary for fitting the cylindrical molded body around the rotary shaft after curing and hardening. Since the cylindrical molded body does not shrink after the curing with the autoclave, the cylindrical molded body may be fitted to the rotary shaft with the adhesive or through forming a fitting clearance by cooling the rotary shaft or heating the cylindrical molded body. Alternatively, the rotary shaft may be press fitted into the hole of the cylindrical molded body. As the adhesive, an epoxy-based adhesive, an urethane-based adhesive, an emulsion-based adhesive, a synthetic rubber-based adhesive, an acrylate-based adhesive or the like is used.

In the second method, since the cylindrical molded body dimensionally shrinks by 0.08 to 0.15% (depending upon the compounding condition) through curing with the autoclave, the inner diameter portion of the cylindrical molded body is formed, taking the shrinkage amount into consideration.

(4) Curing, Hardening

Since it takes a few hours to several days for the molded body to exhibit strength sufficient for mold-releasing after press molding, curing is necessary. The molded body may be left at room temperature as it is or cured in water or cured with steam. Curing in the autoclave is preferred. If water is lacking or insufficient for forming the hardened body, steam curing is preferred. Particularly, curing in the autoclave is preferred. The autoclave curing is effected at 165° C. or higher under a saturated steam pressure of 7.15 kg/cm$^2$, preferably a saturated steam pressure of 9.10 kg/cm$^2$ or higher. The curing time depends upon the curing temperature, and is 5 to 15 hours at 175° C. After the press molding, the molded body preferably exhibits compression strength of around 5 N/mm$^2$ before starting the autoclave curing. If the molded body does not exhibit sufficient strength before the autoclave curing, the molded body will be cracked.

FIG. 2 is a sectional view of the extruding.

Best Mode of Embodiments

EXAMPLES

Examples of the present invention will be explained below.

Example 1

A hydraulic composition was extruded by the method shown in FIG. 1, and cut in a given length, thereby obtaining a cylindrical roller molded body having a hole in a central portion thereof. After a rotary shaft was inserted through the hole, a paper feed roller was produced by curing and hardening the molded in the autoclave curing and thus integrally fixing the roller portion around the outer periphery of the rotary shaft. At that time, the paper feed roller portion shrunk by about 0.2%, and fixed around the outer periphery of the rotary shaft. The materials used and dimensions were as follows.

Formulation in Example

The hydraulic composition had the following formulation, and was mixed by a kneader.

Mixed powder: 100 wt. parts (Hydraulic powder: Portland cement 80 wt %)

(Non-hydraulic powder: silica fume 10 wt %)

(Extrusion improver: talc 10 wt %)

Workability improver: acrylic resin 5 wt. parts (based on dried weight)

Thickening agent: carboxylmethyl cellulose 2 wt. parts

Water: 25 wt. parts

Rotary shaft: SUM 22 L, outer diameter 8 mm, length 535 mm

Roller portion: outer diameter 22 mm, length 485 mm

After the roller portion was fixed around the outer periphery of the rotary shaft, a paper feed roller with a high precision was produced by finishing through centerless grinding.

Example 2

A hydraulic composition was extruded by the method shown in FIG. 1, and cut in a given length, thereby obtaining a cylindrical roller molded body having a hole in a central portion thereof. After a cylindrical roller portion was formed by subjecting the molded body to reaction hardening in autoclave curing, and a rotary shaft was inserted through a hole of the roller portion. Then, a paper feed roller was produced by integrating and fixing the roller portion around the outer periphery of the rotary shaft with an adhesive. A clearance between the hole of the hardened cylindrical roller portion and the outer periphery of the rotary shaft was around 20 $\mu$m. The materials used and dimensions were almost the same as in Example 1.

Formulation in Example

The hydraulic composition had the following formulation, and was mixed by a kneader.

Mixed powder: 100 wt. parts (Hydraulic powder: Portland cement 80 wt %)

(Non-hydraulic powder: silica fume 10 wt %)

(Extrusion improver: talc 10 wt %)

Workability improver: acrylic resin 5 wt. parts (based on dried weight)

Thickening agent: carboxylmethyl cellulose 2 wt. parts

Water: 25 wt. parts

Rotary shaft: SUM 22 L, outer diameter 8 mm, length 535 mm

Roller portion: outer diameter 22 mm, length 485 mm

Kind of adhesive: epoxy resin adhesive

After the roller portion was fixed around the outer periphery of the rotary shaft, a paper feed roller with a high precision was produced by finishing through centerless grinding.

Example 3

A hydraulic composition was extruded around the outer periphery of a rotary shaft by using the method shown in FIG. 2, and a cylindrical roller molded body, which had a given length and a hole in a central portion thereof, was integrally formed around the outer periphery of the rotary shaft by cutting opposite end portions of the extruded body. The roller portion was formed by reaction hardening in the autoclave curing. Materials used and dimensions were almost the same as those in Example 1.

Formulation in Example

The hydraulic composition had the following formulation, and was mixed by a kneader.

Mixed powder: 100 wt. parts (Hydraulic powder: Portland cement 80 wt %)

(Non-hydraulic powder: silica fume 10 wt %)

(Extrusion improver: talc 10 wt %)

Workability improver: acrylic resin 5 wt. parts (based on dried weight)

Thickening agent: carboxylmethyl cellulose 2 wt. parts

Water: 25 wt. parts

Rotary shaft: SUM 22 L, outer diameter 8 mm, length 535 mm

Roller portion: outer diameter 22 mm, length 485 mm

After the roller portion was fixed around the outer periphery of the rotary shaft, a paper feed roller with a high precision was produced by finishing through centerless grinding.

Comparative Example 1

Nine cylindrical roller molded body units each having a hole in a central portion were formed by press molding a hydraulic composition by using the method shown in FIG. 1, a rotary shaft was inserted through the holes of the molded body units, and the units were connected together. Then, a paper feed roller was produced by curing and hardening the molded body units in the autoclave curing and thus integrating and fixing the roller portion around the outer periphery of the rotary shaft. The paper feed roller portion was fixed around the outer periphery of the rotary shaft through being shrunk by about 0.2%. Materials used and dimensions were the same as those in Example 1 except that the length of the molded body unit was 54 mm.

Formulation in Comparative Example

The hydraulic composition had the following formulation, and was mixed by a Henschel mixer.

Mixed powder: 100 wt. parts (Hydraulic powder: Portland cement 70 wt %)

(Non-hydraulic powder: silica fume 30 wt %)

Workability improver: acrylic resin 9 wt. parts (based on dried weight)

Water: 25 wt. parts

Rotary shaft: SUM 22 L, outer diameter 8 mm, length 535 mm

Roller molded body unit: outer diameter 22 mm, length 54 mm

Roller portion: length 486 mm

After the roller portion was fixed around the outer periphery of the rotary shaft, a paper feed roller with a high precision was produced by finishing through centerless grinding.

Comparative Example 2

Nine cylindrical roller molded body units each having a hole in a central portion were formed by press molding a hydraulic composition by using the method shown in FIG. 1, roller portion units were formed by reaction hardening the molded body units in the autoclave curing. A rotary shaft was inserted through the holes of the roller portion units, and a paper feed roller was produced by integrating and fixing the roller portion around the outer periphery of the rotary shaft with an adhesive. A clearance was about 20 $\mu$m between the hole of the hardened roller portion and the outer periphery of the rotary shaft. Materials used and dimensions were the same as those in Example 1 except that the length of the molded body unit was 54 mm.

Formulation in Comparative Example

The hydraulic composition had the following formulation, and was mixed by a Henschel mixer.

Mixed powder: 100 wt. parts (Hydraulic powder: Portland cement 70 wt %)

(Non-hydraulic powder: silica fume 30 wt %)

Workability improver: acrylic resin 9 wt. parts (based on dried weight)

Water: 25 wt. parts

Rotary shaft: SUM 22 L, outer diameter 8 mm, length 535 mm

Roller molded body unit: outer diameter 22 mm, length 54 mm

Roller portion: length 486 mm

After the roller portion was fixed around the outer periphery of the rotary shaft, a paper feed roller with a high precision was produced by finishing through centerless grinding.

With respect to the paper feed rollers obtained in Examples 1 and 2 and Comparative Examples 1 and 2, a warped amount (mm) in a central portion of the roller was measured under the condition that two supporting points were spaced by a span of 300 mm and a 20 Kg load was applied to a central portion of the roller between the support points. Results are shown in Table 1.

| | Warped amount (mm) |
|---|---|
| Example 1 | 0.28 |
| Example 2 | 0.31 |
| Example 3 | 0.30 |
| Comparative Example 1 | 1.30 |
| Comparative Example 2 | 0.62 |

As understood from the above results, the paper feed rollers in Examples 1 to 3 according to the present invention in which the extruded roller portion is integrated and fixed around the outer periphery of the rotary shaft exhibited had smaller warped amounts and thus higher rigidity. On the other hand, it is seen that the paper feed rollers in Comparative Examples 1 and 2 in which the roller portion is formed in a divided manner and integrated and fixed around the outer periphery of the rotary shaft, while being connected together had larger warped amounts and thus smaller rigidity.

Industrial Applicability

According to the paper feed roller-producing method according to the present invention, the paper feed roller having high rigidity with no connecting portion in the roller portion can be mass produced less inexpensively with a high precision by extruding the hydraulic composition used.

What is claimed is:

1. A method for producing a paper feed roller comprising a rotary shaft and a cylindrical roller portion integrated around an outer periphery of the rotary shaft, comprising the steps of:

providing a rotary shaft;

forming a roller portion by extruding a hydraulic composition along a rotational axis of the rotary shaft;

and curing and hardening the extrudate.

2. The paper feed roller-producing method set forth in claim 1, wherein the hydraulic composition is concentrically extruded around the rotary shaft, and cured and hardened to integrate the rotary shaft and the roller portion.

3. The paper feed roller-producing method set forth in claim 1, wherein the hydraulic composition comprises 100 wt. parts of a mixed powder, 2 to 9 wt. parts of a workability improver, and 0.5 to 5 wt. parts of a thickening agent, said mixed powder comprising 40 to 80 wt % of a hydraulic powder, 10 to 50 wt % of a non-hydraulic powder having the average particle diameter smaller than that of the hydraulic powder by an order of one digit or more, and 10 to 30 wt % of an extrusion improver.

4. The paper feed roller-producing method set forth in claim 3, wherein the extrusion improver is an inorganic scaly material.

5. The paper feed roller-producing method set forth in claim 3, wherein the workability improver is a powder or emulsion composed of at least one resin selected from a vinyl acetate resin, a copolymer resin with vinyl acetate, an acrylic resin, an acrylic copolymer resin, a styrene resin, a copolymer resin with styrene and an epoxy resin.

6. The paper feed roller-producing method set forth in claim 4, wherein the workability improver is a powder or emulsion composed of at least one resin selected from a vinyl acetate resin, a copolymer resin with vinyl acetate, an acrylic resin, an acrylic copolymer resin, a styrene resin, a copolymer resin with styrene and an epoxy resin.

7. The method of claim 1, wherein a tolerance of an outer diameter of the paper feed roller is suitable for feeding paper.

8. The method of claim 7, wherein the tolerance of the outer diameter of the paper feed roller is suitable for feeding paper within one of a printer, facsimile machine, and a copy machine.

9. The method of claim 8, wherein the tolerance of the outer diameter of the paper feed roller is suitable for feeding paper within a printer.

10. The method of claim 8, wherein the tolerance of the outer diameter of the paper feed roller is suitable for feeding paper within a facsimile machine.

11. The method of claim 8, wherein the tolerance of the outer diameter of the paper feed roller is suitable for feeding paper within a copy machine.

* * * * *